United States Patent
Asai

(10) Patent No.: US 6,714,747 B2
(45) Date of Patent: Mar. 30, 2004

(54) IMAGE FORMING APPARATUS WITH DIFFERENT RECORDING SHEETS FEEDING AND DISCHARGING FEATURES

(75) Inventor: Hidehiko Asai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/079,868

(22) Filed: Feb. 22, 2002

(65) Prior Publication Data

US 2002/0118975 A1 Aug. 29, 2002

(30) Foreign Application Priority Data

Feb. 27, 2001 (JP) ...................................... 2001/052228

(51) Int. Cl.$^7$ .............................................. G03G 15/00
(52) U.S. Cl. ........................................ 399/45; 399/405
(58) Field of Search .............................. 399/1, 2, 3, 45, 399/81, 82, 391, 397, 403, 405, 407, 408, 410

(56) References Cited

U.S. PATENT DOCUMENTS 5,166,739 A * 11/1992 Katsuki et al. ......... 399/397 X
5,229,814 A * 7/1993 Hube et al. ............... 399/81 X
5,729,791 A * 3/1998 Kutsuwada et al. ......... 399/82
6,356,719 B1 * 3/2002 Yoshiura ..................... 399/45

FOREIGN PATENT DOCUMENTS

| EP | 0 631 425 A2 | 12/1994 | |
|---|---|---|---|
| EP | 1 045 294 A2 | 10/2000 | |
| JP | 4-49168 | 2/1992 | |
| JP | 5-147287 | 6/1993 | |
| JP | 9-188455 | 7/1997 | |
| JP | 09-194126 | * | 7/1997 |

* cited by examiner

Primary Examiner—Sandra Brase
(74) Attorney, Agent, or Firm—Fitzpatrick, Cella, Harper & Scinto

(57) ABSTRACT

To cope with a situation that kinds of recording sheets capable of being discharged by a discharger are limited, in an image forming apparatus which has plural discharge trays, the kind of recording sheet is first discriminated, it is judged whether or not the recording sheet of the discriminated kind can be discharged to the discharge tray to which recording sheets should be discharged, feeding of the recording sheet is controlled based on the judged result, and the contents of the controlling are displayed.

10 Claims, 15 Drawing Sheets

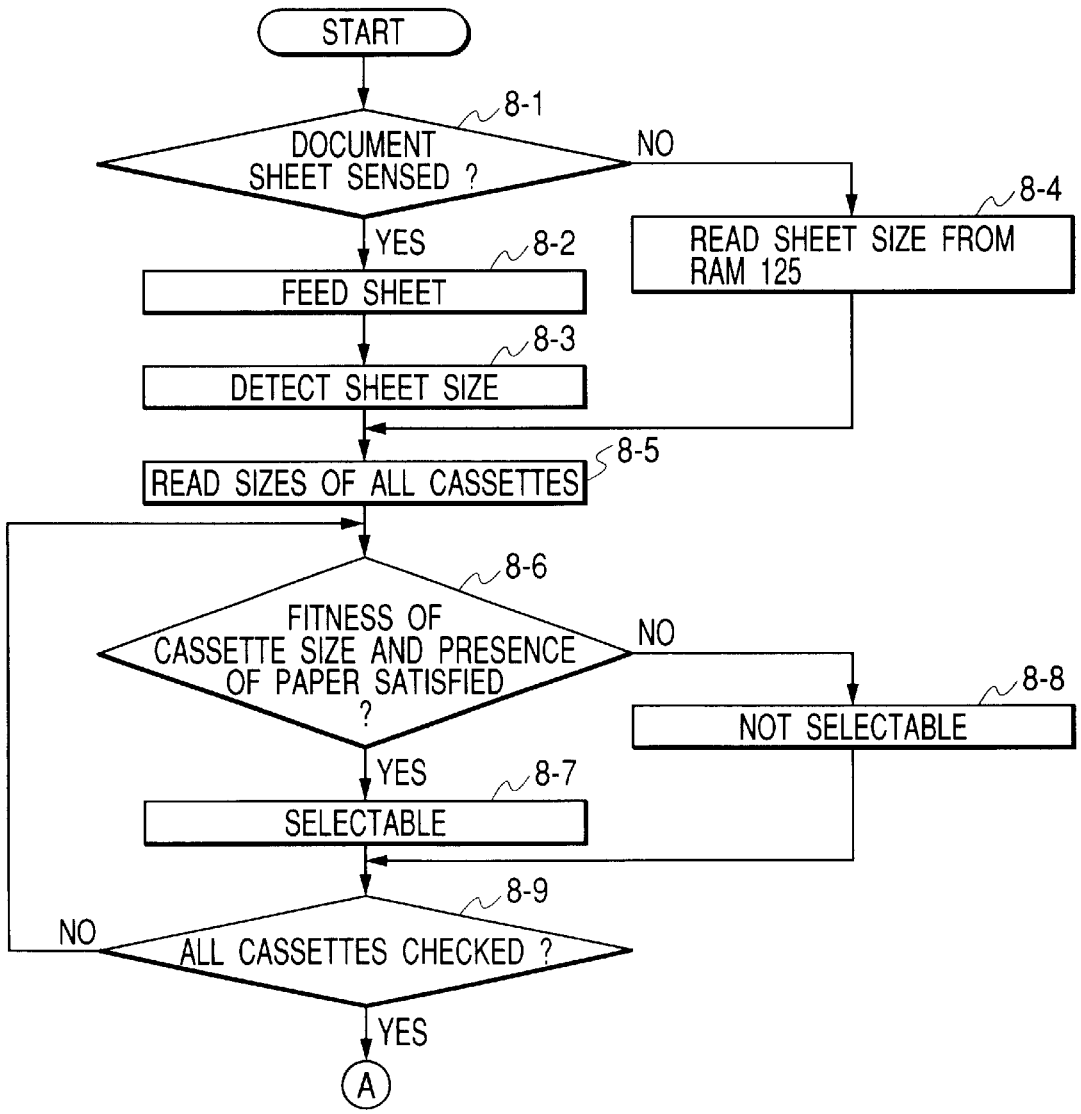

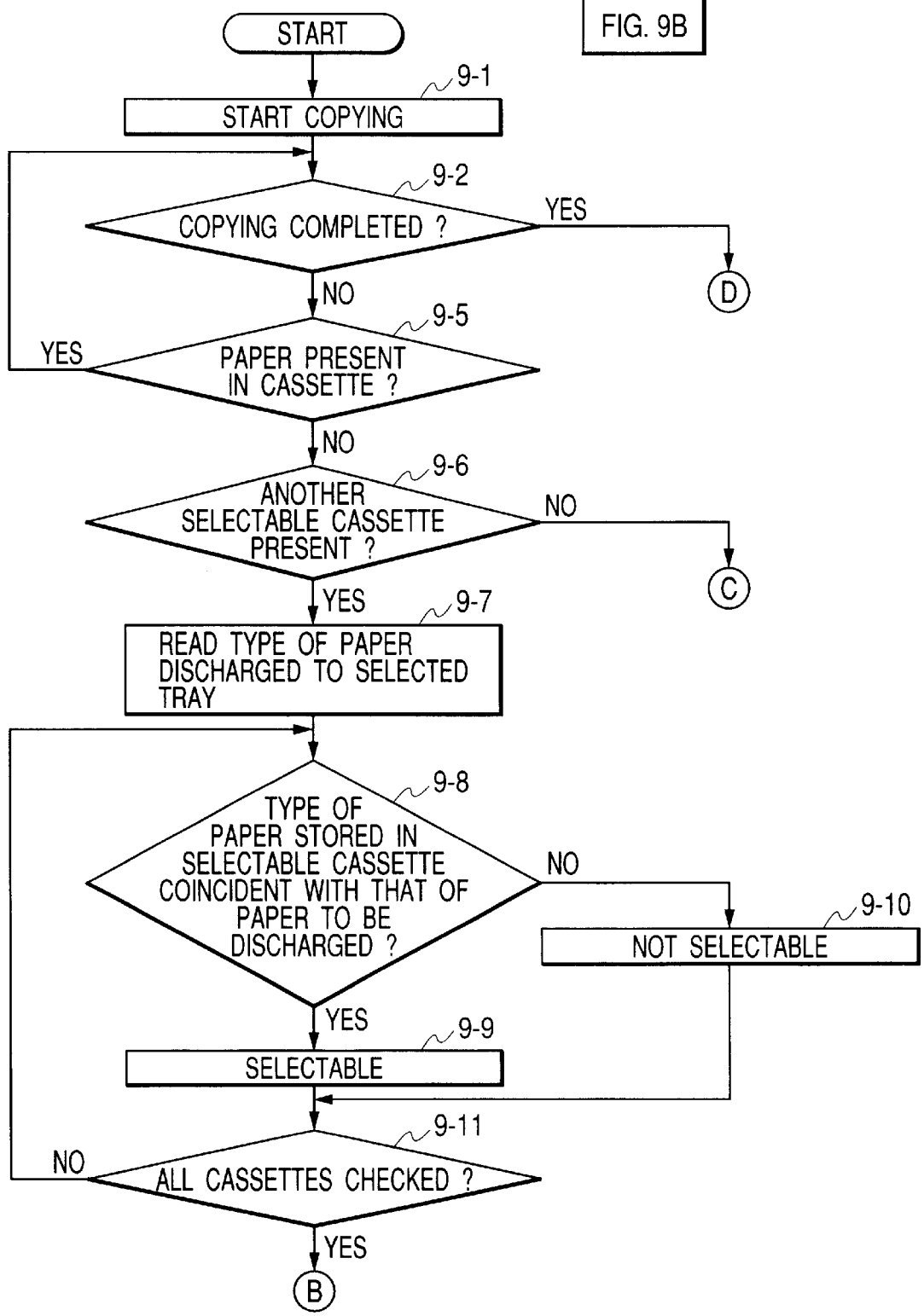

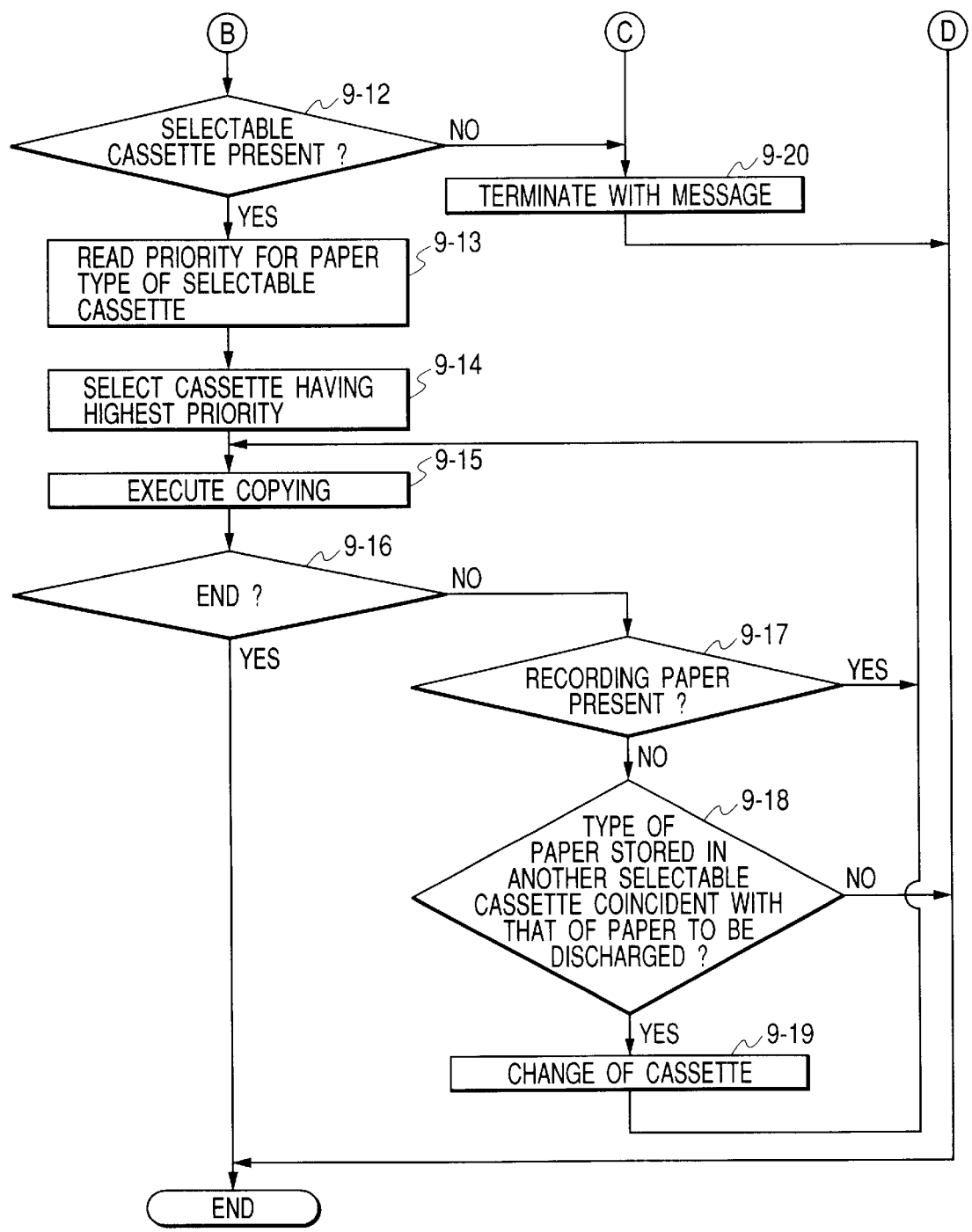

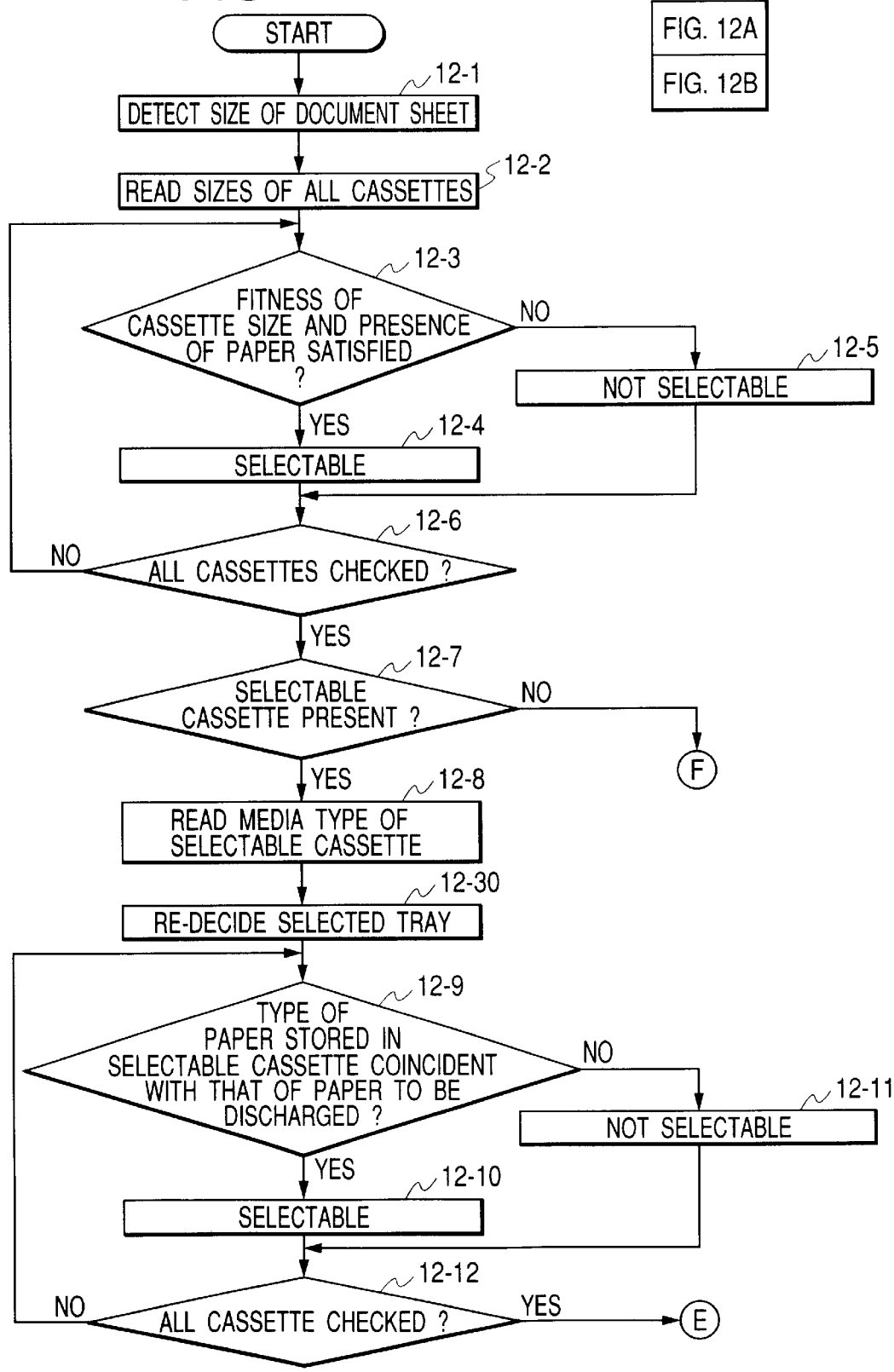

IMAGE FORMING APPARATUS WITH DIFFERENT RECORDING SHEETS FEEDING AND DISCHARGING FEATURES

BACKGROUND OF THE INVENTION

1. Field of the Invention

The present invention relates to an image forming apparatus in which kinds of recording sheets capable of being discharged by a discharger are limited.

2. Related Background Art

Conventionally, there is a finishing device which performs a stapling process or the like to sheets, and the finishing device is mainly connected with a copying machine. Further, a copying machine which includes a designation means to designate a kind of recording sheet and has an APS (auto paper selection) function to select a sheet feed cassette in which the recording sheets of the kind optimum for copying have been designated is developed. Furthermore, in recent years, a copying machine in which a discharge tray for the print-processed recording sheets is provided within the case of an image output device to minimize an occupation space when the machine is set up comes to be developed.

When the above-mentioned various types of recording sheets are handled, the kind of recording sheets capable of being discharged to the finishing device becomes a problem. That is, according to the internal structure of the finishing device, there is a possibility of causing a jam if tough recording sheets are transported to this device.

SUMMARY OF THE INVENTION

An object of the present invention is to provide an image forming apparatus which has solved the above problem.

Another object of the present invention is to provide an image forming apparatus comprising: plural feeders for feeding recording sheets; an image forming unit for forming an image on the recording sheet fed from the feeder; plural dischargers for discharging the recording sheets on which the images have been formed respectively by the image forming unit; a discriminator for discriminating kinds of recording sheets respectively set to the plural feeders; an indicator for indicating, among the plural dischargers, the discharger by which the recording sheets should be discharged; and a selecting unit for selecting the feeder in accordance with the discharger indicated by the indicator and the kind of recording sheet discriminated by the discriminator.

Other objects and features of the present invention will become apparent from the following detailed description and the attached drawings.

BRIEF DESCRIPTION OF THE DRAWINGS

FIG. 9, which is comprised of FIGS. 9A and 9B, is a flow chart of feed cassette automatic change when a feed cassette according to the embodiment of the present invention becomes empty;

DETAILED DESCRIPTION OF THE PREFERRED EMBODIMENTS

Figure 1:
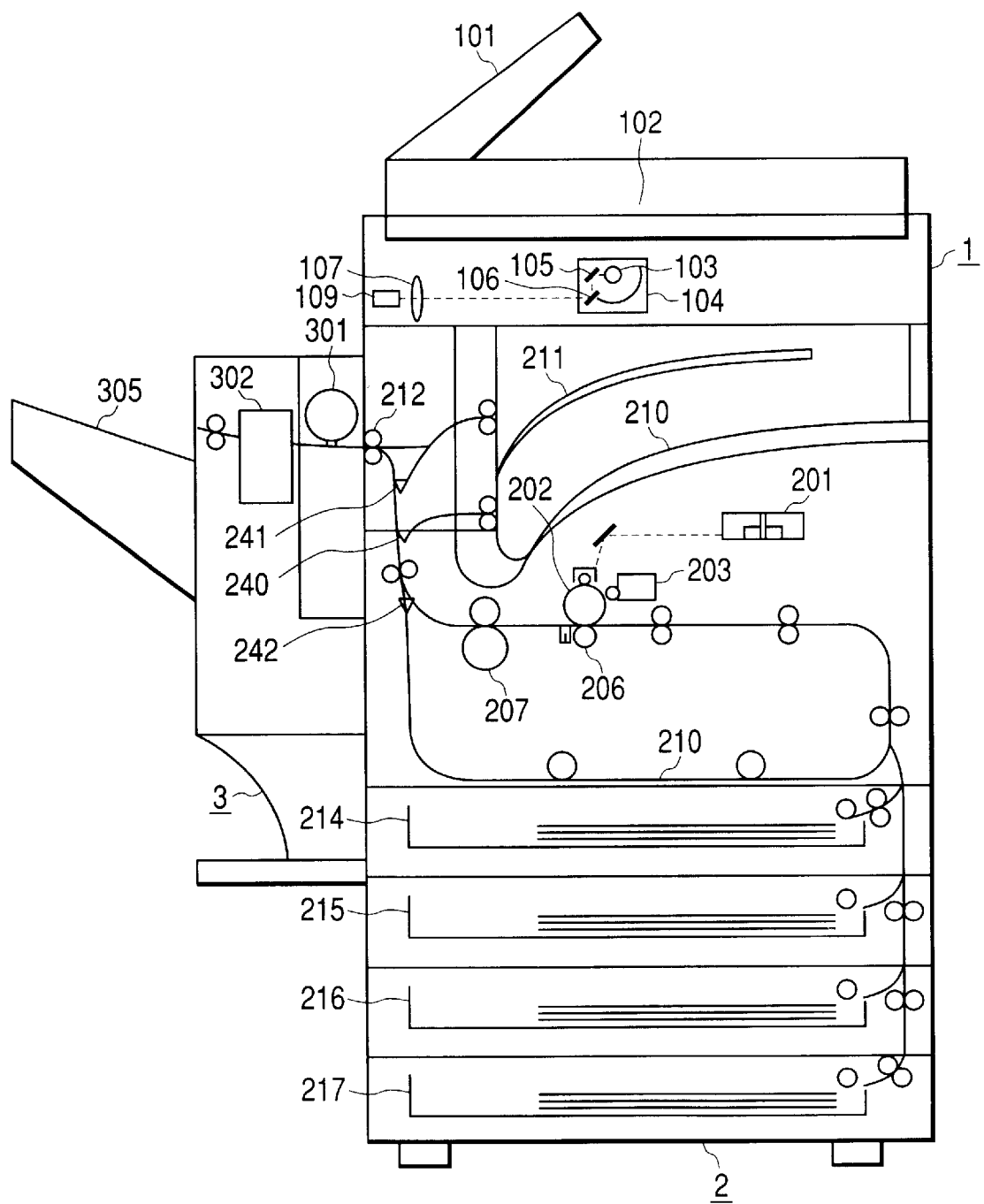
FIG. 1 is a general sectional view showing an image forming apparatus.

FIG. 1 is a sectional view showing the structures of a copying machine according to the embodiment, a reader section 1, and a printer section 2. Hereinafter, the structure and operation of the copying machine will be explained. Document sheets put on a document sheet feeding device 101 are sequentially fed one by one onto a document sheet mounting board glass face 102. If the document sheet is fed to a predetermined position on the glass face 102, a lamp 103 of a scanner section is lit, and a scanner unit 104 is moved to irradiate the document sheet. Reflection light from the document sheet is input to a CCD image sensor unit (simply called a CCD hereinafter) 109 through mirrors 105 and 106 and a lens 107.

Figure 2:
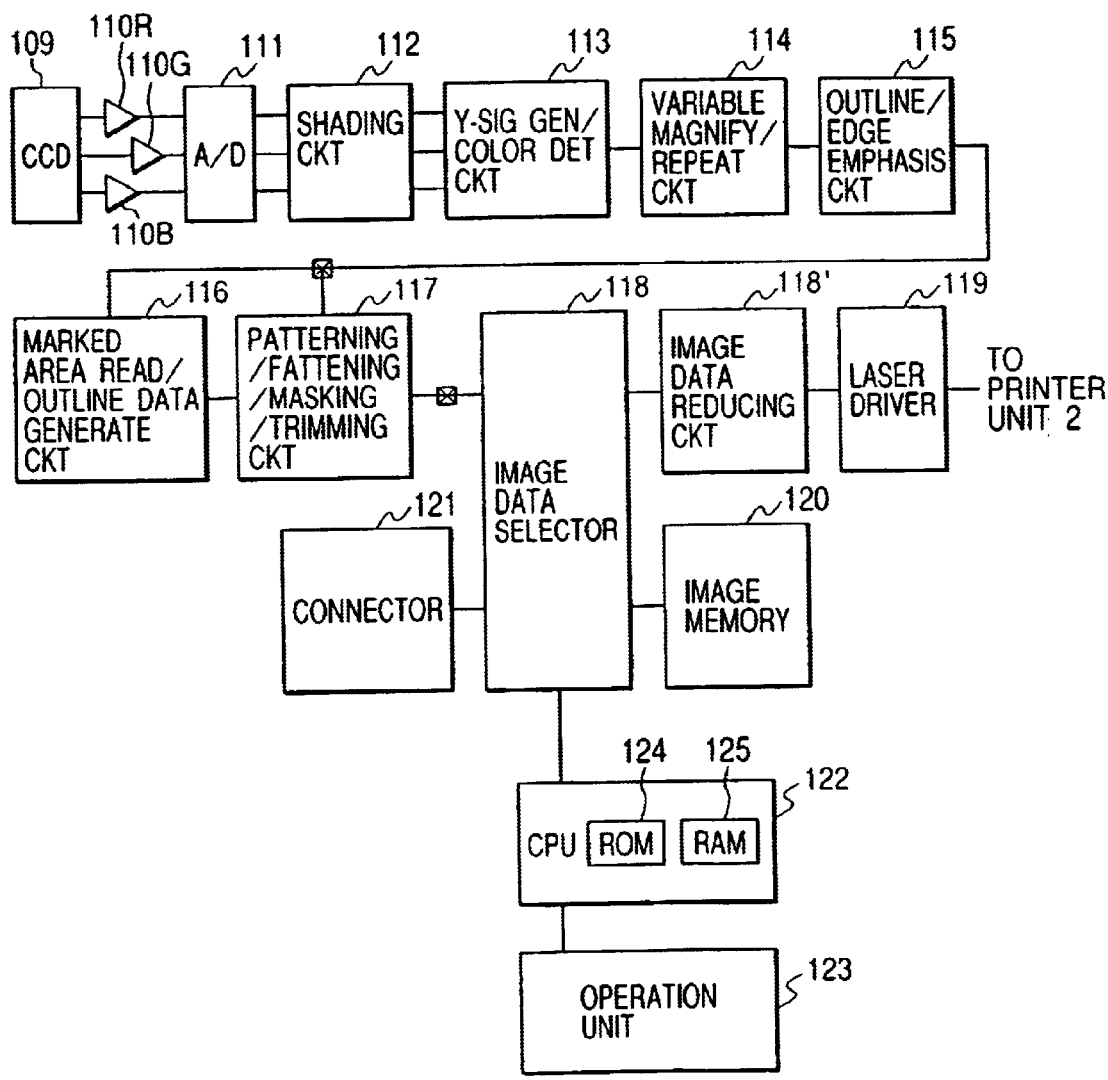
FIG. 2 is a block diagram showing a reader section 1.
Figure 3:
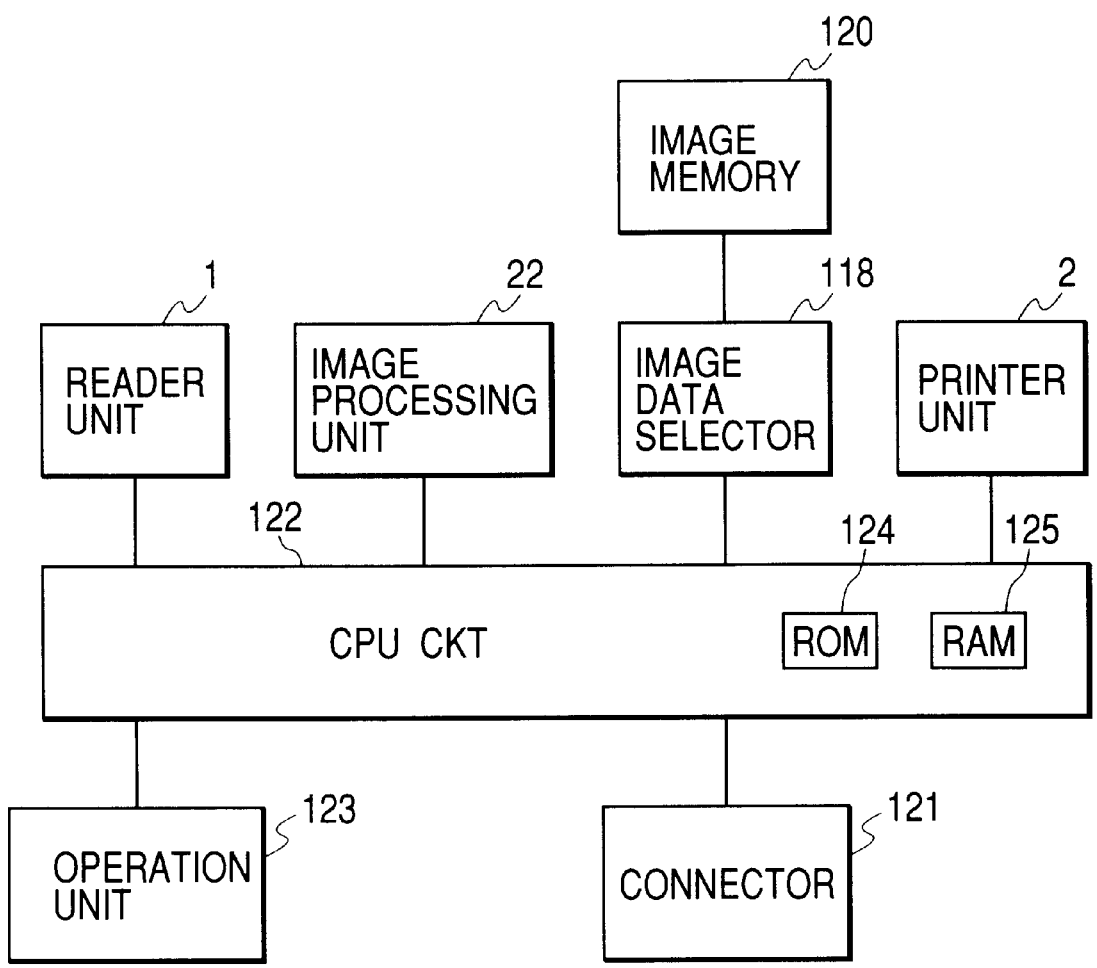
FIG. 3 is a block diagram showing the image forming apparatus.

FIG. 2 is a circuit block diagram showing the signal processing structure of the reader section 1, and FIG. 3 is a block diagram showing the copying machine including the reader section 1 and the printer section 2. Hereinafter, the structures and the operations of these sections will be explained. The reflection light of the document sheet irradiated to the CCD 109 is photoelectrically converted into R (red), G (green) and B (blue) electrical signals. Such color information from the CCD 109 is amplified by next amplifiers 110R, 110G and 110B in accordance with the input signal level of an A/D converter 111. The output signals from the A/D converter 111 are input to a shading circuit 112 to correct irradiation unevenness of the lamp 103 and sensitivity unevenness of the CCD 109, and the output signals from the shading circuit 112 are input to a Y-signal generation/color detection circuit 113 and an external I/F (interface) change circuit.

The Y-signal generation/color detection circuit 113 performs an operation to the signals from the shading circuit 112 to obtain a Y (yellow) signal, in accordance with an expression Y=0.3R+0.6G+0.1B. Further, the circuit 113 includes a color detection circuit which separates the R, G and B signals into seven color components and then outputs a signal representing each color. The output signal from the Y-signal generation/color detection circuit 113 is input to a variable magnify/repeat circuit 114. An image is variably magnified in a sub-scanning direction by a scan speed of the scanner unit 104 and in a main scanning direction by the variable magnify/repeat circuit 114. Moreover, plural identical images can be output by the variable magnify/repeat circuit 114. A high-frequency component of the signal from the variable magnify/repeat circuit 114 is emphasized by an outline/edge emphasis circuit 115 to perform edge emphasis and obtain outline information. The signal from the outline/edge emphasis circuit 115 is input to a marked area read/outline data generate circuit 116 and a patterning/fattening/masking/trimming circuit 117.

The marked area read/outline data generate circuit 116 reads the area on the document sheet written by a marker pen of the designated color and generates outline information of the marked area. The next patterning/fattening/masking/trimming circuit 117 performs fattening, masking and trimming of image on the basis of the outline information, and further performs patterning on the basis of the color detection signal from the Y-signal generation/color detection circuit 113.

The output signal from the patterning/fattening/masking/trimming circuit 117 is selected by a later-described image data selector 118 if it is output to the printer section 2. Connector 121 also provides image data, which may be selected by image data selector 118. Then, the signal is input to a laser driver 119 via an image data reducing circuit 118', thus subjected to various processes, and is converted into the signal for driving a laser. The output signal from the laser driver 119 is input to the printer section 2 and thus subjected to image forming to generate a visible image.

In response to an instruction of a CPU 122, the image data sent from the image selector 118 is stored to and read from the designated position of an image memory 120 in a later-described way. Besides, the image memory 120 has a function to perform a rotation process and synthesize the images on the memory. The CPU 122 which controls the reader section 1 is composed of a ROM 124 for storing a control program, an error processing program and the like, a RAM 125 used for a working area of the various programs and used to store setting information designated by an operation unit 123, various timer control units, and the like. The RAM 125 is backed up by a battery, whereby the information stored in the RAM 125 is maintained even if the power supply of the copying machine is turned off.

Figure 4:
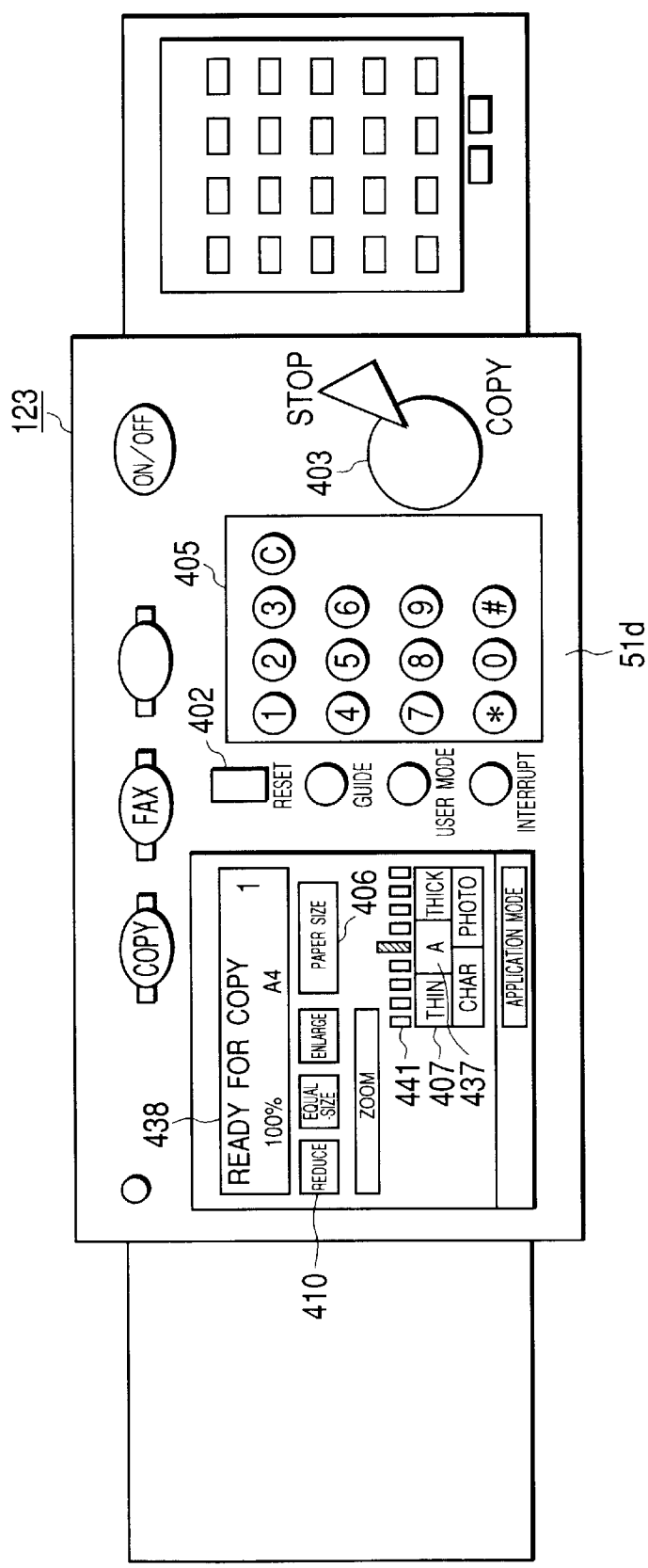
FIG. 4 is an external view showing an operation unit 123.

The operation unit 123 includes various key groups for indicating image operations such as image editing contents, the number of copies, and the like, for the image processes of the reader section 1, and a display unit for displaying the operation contents, and the like. FIG. 4 shows the details of the operation unit 123 on which various keys and a liquid crystal display section (touch screen display) 438 composed of dot matrices of liquid crystal displays are arranged. The liquid crystal display section 438 displays the state of the copying machine, the number of copies, magnifications, selected recording sheets and various operation screens.

A start key 403 is the key for starting the copying, and a reset key 402 is the key for returning the designated mode to a standard state. A key group 405 is composed of numeric keys from "0" to "9" for inputting the number of copies, zoom magnifications and the like, and a clear key for clearing the contents input by the numeric keys. A density key 407 is the key for increasing and decreasing a density, and the density adjusted thereby is displayed on a display area 441. A key 437 is the key for turning on/off an automatic density adjustment function and its display. A key 406 is the key for selecting a feed cassette and an APS function, and its selecting state is displayed on the liquid crystal display section 438. A key 410 is composed of the keys respectively setting equal-size copying and fixed reduce/enlarge copying. A key 440 is the user mode key for enabling designation independently for each user, and later-described designation of kinds of recording sheets is performed by depressing the user mode key.

Figure 5A:
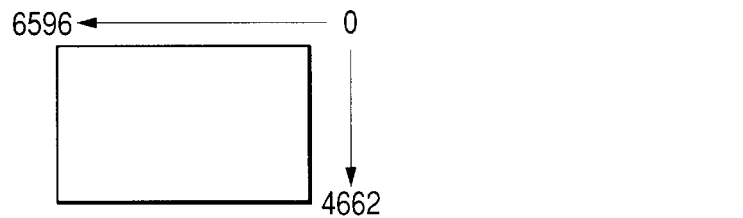
FIGS. 5A, 5B, 5C, 5D and 5E are views for explaining an image storing method and an image reading method.
Figure 5B:
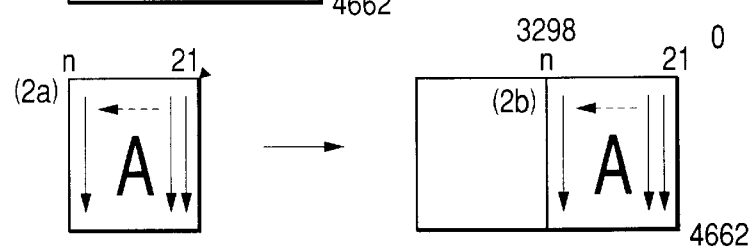
Figure 5C:
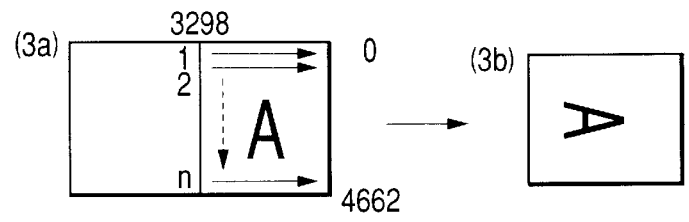

The method of storing and reading the image will be explained with reference to FIGS. 5A to 5E and FIG. 6. FIG. 5A shows a storage capacity (area) of the image memory 120, which is composed of longitudinal 4661 bits×lateral 6596 bits and can store image data of A3 size in the embodiment. This storage area is structured as one image layout area and plural image storage areas as shown in FIG. 6 so that the images of 100 document sheets can be stored. Then, FIG. 5B shows an example that the image of the document sheet is stored in the image memory 120. The document sheet put as shown by (2a) is sequentially read in the direction indicated by the arrows. That is, as shown by (2b), an X-direction counter is designated to be up and a Y-direction counter is designated to be up from the start position at the address (0, 0), and if the first line is initially read, the read data is sequentially written from the address (0, 0) in the memory along, the direction toward the address (0, 4661). Next, if the second line is read, the X-direction counter is set to be up, and the read data is sequentially written from the address (1, 0) along the direction toward the address (1, 4661). Next, if the third line is read, the X-direction counter is set to be up, and the read data is sequentially written from the address (2, 0) to the address (2, 4661). Like this, the reading and the writing are repeated, whereby the image data is written up to the address (3297, 4661).

The process that the image data written in the memory as shown in FIG. 5B is read based on the way shown in FIGS. 5C and 5D will be explained. In FIG. 5C, the X-direction counter is designated to be down and the Y-direction counter is designated to be up from the start position at the address (3271, 0), and, as shown by (3a), the stored data of the first line is read from the start position as sequentially setting the X-direction counter down along the direction toward the address (0, 0). Next, the Y-direction counter is set to be up, and the image data of the second line is read from the address (3297, 1) along the direction toward the address (0, 0). Thus, by sequentially reading the image data like this, the image shown by (3b) can be read.

Figure 5D:
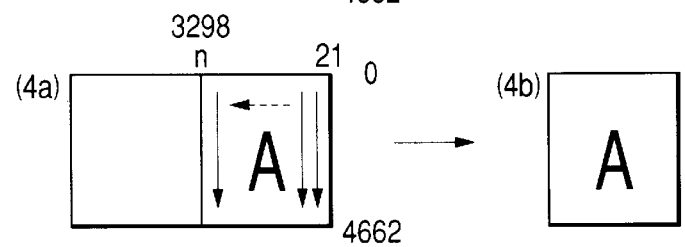
Figure 5E:
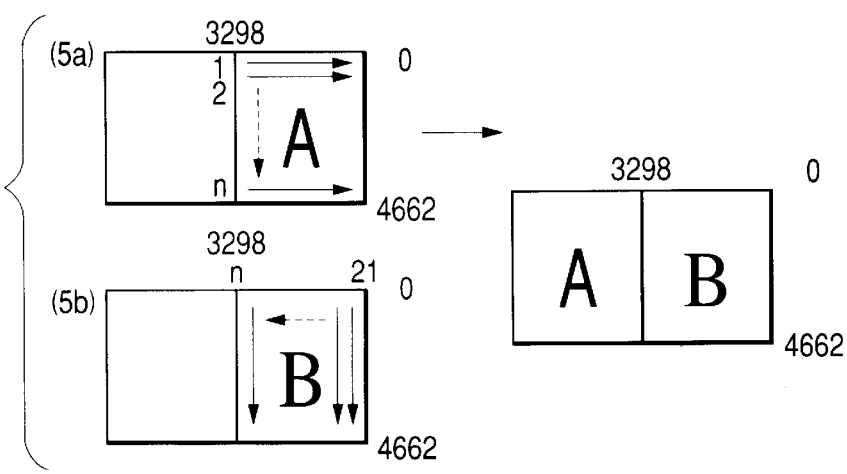
Figure 6:
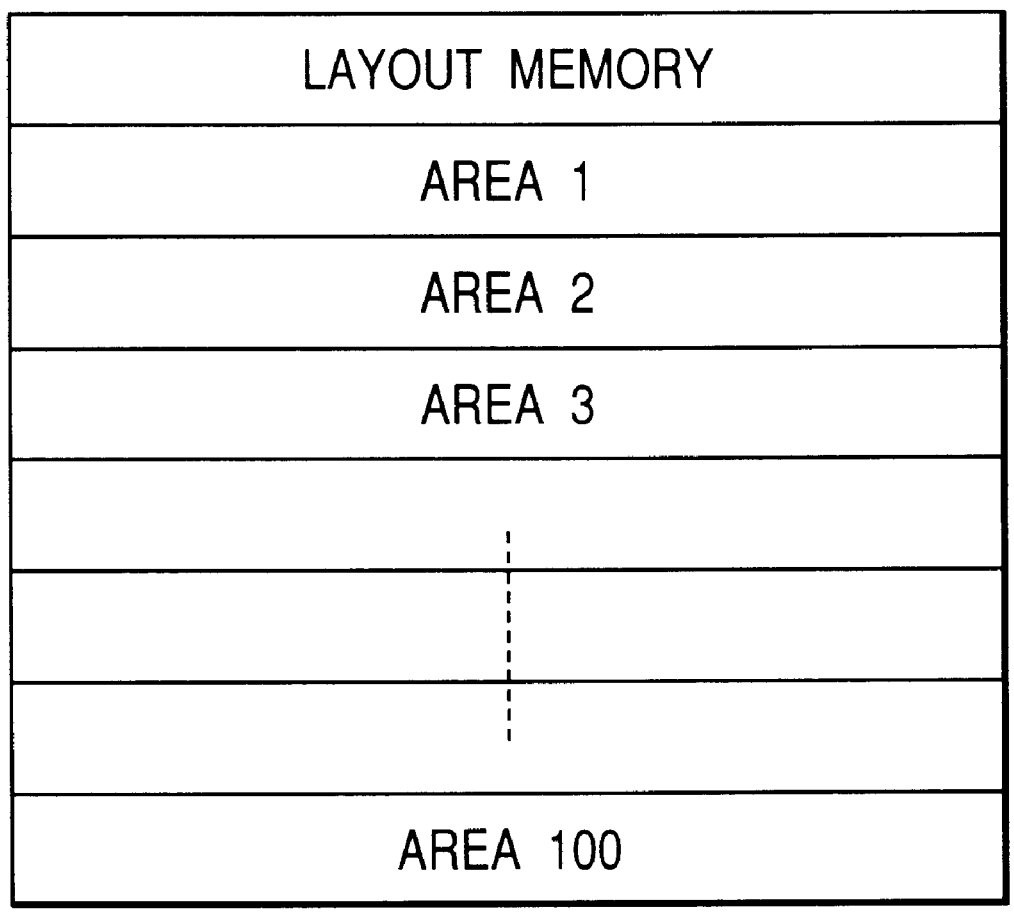
FIG. 6 is a view for explaining an image memory 120.

In FIG. 5D, the X-direction counter is designated to be up and the Y-direction counter is designated to be down from the start position at the address (0, 0), and, as shown by (4a), the stored data of the first line is read from the start position as sequentially setting the Y-direction counter up along the direction toward the address (0, 4661). Next, the X-direction counter is set to be up, and the image data of the second line is read from the address (1, 0) along the direction toward the address (1, 4661). Thus, by sequentially reading the image data like this, the image shown by (4b) can be read. Therefore, by reading the document sheet of A-4 width shown by (2a) along the direction indicated by FIG. 5D, the image can be read without rotation.

Next, image layout will be explained. As described above, images independently stored as shown by (5a) and (5b) are read and then written respectively at the desired positions in the image memory 120, whereby the images of the different document sheets can be synthesized on the image memory 120 as shown by (5c).

The structure and the operation of the printer section 2 will be explained with reference to FIG. 1. The image signal input to the printer section 2 is converted into a modified light signal by an exposure control unit 201 and then irradiated to a photosensitive body 202. A latent image formed on the photosensitive body 202 by the irradiated light is developed by a developing unit 203. The recording sheet is fed from a feed cassette 214, 215, 216 or 217 at timing coincident with the leading edge of the developed image, and the developed image is transferred to the recording sheet by a transfer unit 206. The transferred image is fixed to the recording sheet by a fixing unit 207, and the sheet is discharged to a discharge tray 210, 211 or 305. When the recording sheet is discharged to the discharge tray 210, a flapper 240 is turned (or tilted) to the opposite side of the discharge tray 210. When the recording sheet is discharged to the discharge tray 211, a flapper 241 is turned to the opposite side of the discharge tray 211, whereby the sheet can pass the tray 211. When the recording sheet is discharged faceup to the discharge tray 305, the flapper 241 is turned to the side of the discharge tray 211. Further, when the recording sheet is discharged facedown to the discharge tray 305, the flapper 241 is turned to the side opposite to the discharge tray 211, whereby the recording sheet is once guided to the side of the discharge tray 211, the guided sheet is switchbacked, and thereafter the sheet is discharged facedown to the discharge tray 305 through discharge rollers 212. Here, the discharged recording sheets are transported to a finisher (finishing device) 3 to be punched by a punch unit 301 if a punch function is available, and stapled by a stapler 302 if stapling is necessary, and then the recording sheets passed the stapler 302 are discharged to the discharge tray 305.

To prevent a jam, kinds of dischargeable recording sheets have been determined for each of the discharge trays 210, 211 and 305, and these kinds have been stored in the ROM 124 or the RAM 125. Concretely, in the ROM 124 or the RAM 125, it has been stored that only a plain sheet and a recycled sheet can be discharged to the discharge trays 211 and 305, and it has been stored that a plain sheet, a recycled sheet, a color sheet, a perforated sheet, a label sheet, a thick sheet, an OHP sheet, a letter head sheet and a second traced sheet (thin sheet) can be discharged to the discharge tray 210. Thus, the kinds of recording sheets dischargeable to the discharge trays 211 and 305 are limited.

Subsequently, a method of outputting the sequentially read images to the both faces of one recording sheet will be explained. The recording sheet to which the image has been fixed by the fixing unit 207 is once transported to the discharge tray 210, and then the transportation direction of the sheet is reversed to transport the sheet to a refeed recording sheet stack unit 210 through a flapper 242. If a next document sheet is prepared, the image on this document sheet is read according to the same process as above. However, since the recording sheet is fed from the refeed recording sheet stack unit 210, the two document sheet images can be output to the front and back faces of the same recording sheet.

Figure 7A:
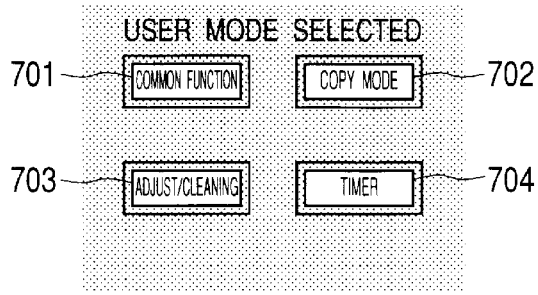
FIGS. 7A, 7B, 7C, 7D, 7E, 7F, 7G and 7H are views respectively showing operation screens on the operation unit 123.
Figure 7B:
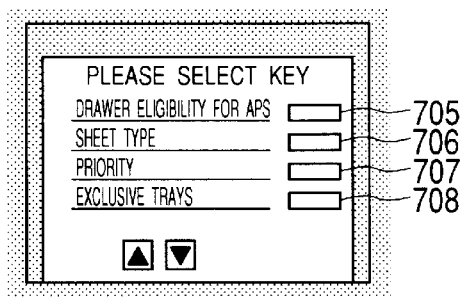
Figure 7C:
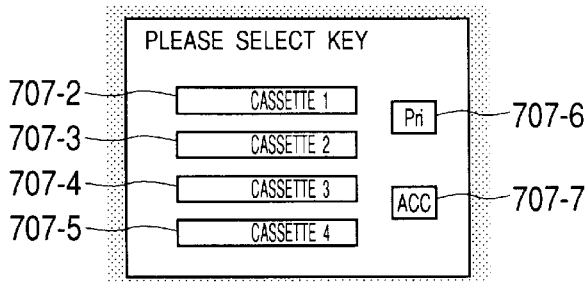
Figure 7D:
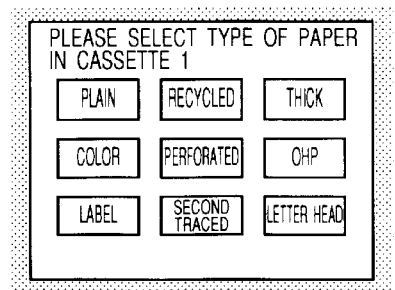
Figure 7E:
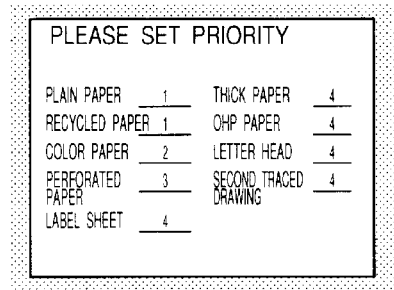
Figure 7F:
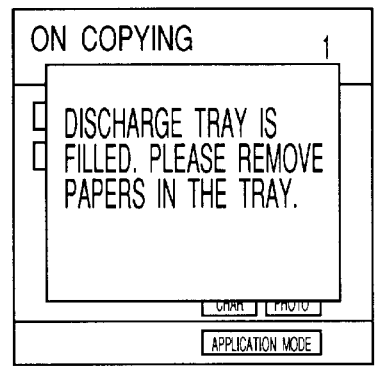
Figure 7G:
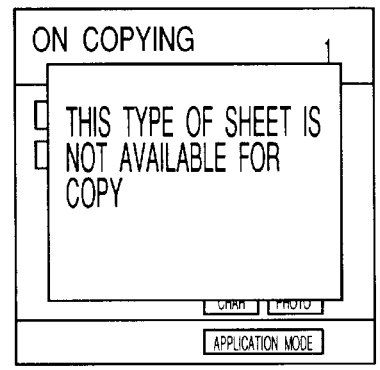

Next, a method of designating the kinds of recording sheets will be explained with reference to FIGS. 7A to 7H. It is assumed that the recording sheets of B4 size have been held in the feed cassette 214, the recording sheets of A4 size have been held in the feed cassette 215, the recording sheets of A4 size have been held in the feed cassette 216, and the recording sheets of A4 size have been held in the feed cassette 217. If the user mode key is depressed, the operation screen shown in FIG. 7A is displayed on the liquid crystal display section 438. A key 701 is the common function designation key for performing the designation for the operations of the machine in common, and a key 702 is the key for performing the designation for the copy function, e.g., designating ON/OFF of automatic rotation. A key 703 is the key for adjustment and cleaning, e.g., designating the adjustment for zooming. A key 704 is the key concerning a timer, and a date, a time and the like can be designated by depressing this key. If the common function designation key 701 is depressed, the operation screen shown in FIG. 7B is displayed. A key 705 is the key for designating "drawer eligibility for APS", and the feed cassette being the target of APS can be designated by depressing this key. A key 706 is the key for designating the kinds of recording sheets, and the operation screen shown in FIG. 7C is displayed by depressing this key. If key 707 is depressed, the operation screen changes from that shown in FIG. 7B to that shown in FIG. 7E. Further, if any one of keys 707-2 to 707-5 on the screen of FIG. 7C is depressed, then the operation screen shown in FIG. 7D is displayed, whereby the kind of recording sheet for each of the feed cassettes can be designated. In the embodiment, it is assumed that the feed cassette 241 is designated to hold the plain sheet. Similarly, it is assumed that the feed cassette 215 is designated to hold the color sheet, the feed cassette 216 is designated to hold the recycled sheet, and the feed cassette 217 is designated to hold the plain sheet. Numeral 707-6 denotes a key for designating priority of the kinds of recording sheets, and if the key 707-6 is depressed, the then operation screen changes from that shown in FIG. 7C to the operation screen displayed in FIG. 7E. On this screen, the priority of the kinds of recording sheets in the APS can be designated by using the numeric keys 405. In the embodiment, it is assumed that the priority of the plain sheet is designated to "1", the priority of the recycled sheet is designated to "2", the priority of the color sheet is designated to "3", and the priority of the thick sheet is designated to "4". A key 707-7 is the key for designating whether or not the feed cassette should be changed if the recording sheets become empty. The above designation has been stored in the RAM 125.

Figure 7H:
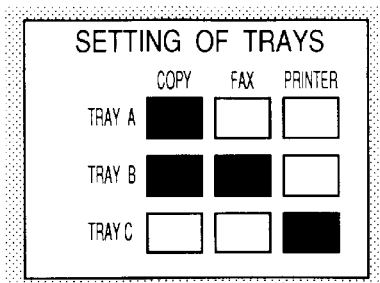
Figure 8B:
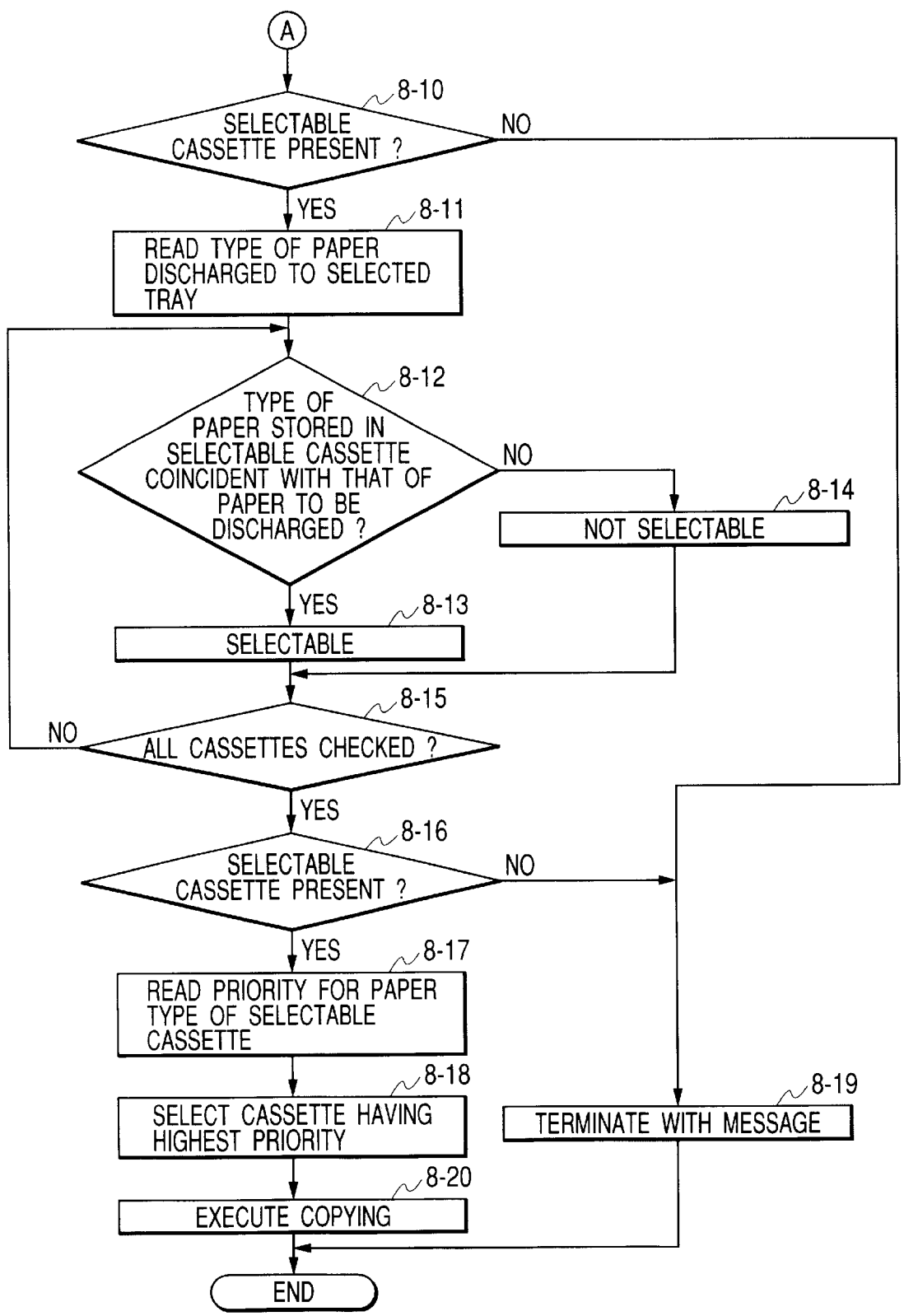
FIG. 8, which is comprised of FIGS. 8A and 8B, is a flow chart of feed cassette automatic selection according to the embodiment of the present invention.

Upon depressing key 708, a screen shown in FIG. 7H, which is the screen for setting and designating dedicated trays, is displayed. That is, a tray A corresponds to the discharge tray 305, a tray B corresponds to the discharge tray 210, and a tray C corresponds to the discharge tray 211. In the embodiment, it has been set that the sheets are discharged to the tray A (discharge tray 305) and the tray B (discharge tray 210) in a copy mode, the sheets are discharged to the tray B (discharge tray 210) in a facsimile mode, and the sheets are discharged to the tray C (discharge tray 211) in the printer mode. The information concerning the setting of the discharge tray for each mode has been stored in the RAM 125.

Next, the operations using the setting of the kinds of recording sheets will be explained with reference to flowcharts shown in FIGS. 8A and 8B to FIG. 11. It should be noted that the programs to execute the operations of the following flowcharts have been stored in the ROM 124, and these programs are read and actually executed by the CPU 122. First, it is judged by a not-shown document sheet sensor mounted on the document sheet tray of the document sheet feeding device 101 of FIG. 1 whether or not the document sheet is present (8-1). At this time, if the document sheet is not present on the tray of a not-shown document sheet mounting board, the size sensed by a size sensor on the board is read from the RAM 125 (8-4). On the other hand, if the document sheet is present in the document sheet feeding device 101, such the document sheet is fed (8-2), and the document sheet size is sensed on the basis of the width of a document sheet guide and the length of the document sheet fed onto the document sheet mounting board glass (8-3). In the embodiment, since the width of the document sheet guide is 297 mm and the length of the document sheet fed is 210 mm, the document sheet size is sensed as A4.

Next, the recording sheet optimum for the A4 document sheet is selected. First, the sizes of all the feed cassettes are detected (8-5), and it is judged whether or not the feed cassette being the target of APS is present (8-6). In the embodiment, since the recording sheet sizes of the feed cassettes 214, 215, 216 and 217 are B4, A4, A4 and A4 respectively, the feed cassettes 215, 216 and 217 first become the targets of APS. Then, it is sensed whether or not the recording sheet is actually present in these cassettes (8-6). Since the recording sheets are held in the respective feed cassettes, these cassettes are designated as the selectable targets (8-7). On the other hand, if the recording sheet is not held in these cassettes, they are eliminated form the selectable target (8-8). Such a check is performed to all the feed cassettes (8-9). Here, if the feed cassette being the feed target is not present (8-10), it is displayed on the operation unit 123 that an optimum recording sheet is not present (8-19), and the operation terminates.

Next, the discharge tray to which the recording sheets should be discharged is determined by referring to the discharge trays designated on the screen of FIG. 7H and stored in the RAM 125, and the type of recording sheet capable of being discharged to the determined discharge tray is read from the ROM 124 or the RAM 125 (8-11). If a stapling process is designated in the copy mode, the discharge tray to which the recording sheets should be discharged is determined as the discharge tray 305. Here, the kinds of recording sheets capable of being discharged to the discharge tray 305 is the plain sheet and the recycled sheet.

Next, the kinds of recording sheets in the feed cassettes 215, 216 and 217 are read from the RAM 125. In the embodiment, it is assumed that the feed cassette 215 holds the color sheets, the feed cassette 216 holds the recycled sheets, and the feed cassette 217 holds the plain sheets. At this time, it is judged whether or not the kind of recording sheet in each feed cassette is coincident with the kind of recording sheet capable of being discharged to the discharge tray 305 (8-12). Since the feed cassette 215 holds the color sheets, this cassette is eliminated from the selectable target (8-14). On the other hand, the feed cassettes 216 and 217 satisfy the condition in the step 8-12 (8-13). If all the target feed cassettes are checked (8-15), it is further judged whether or not there is the selectable feed cassette on the basis of the kinds of recording sheets in the feed cassettes and the kind of recording sheet capable of being discharged to the designated discharge tray (8-16). If the feed cassette being the feed target is not present, it is displayed on the operation unit 123 that an optimum recording sheet is not present (8-19), and the operation terminates.

Next, the designated priorities of the kinds of recording sheets in the feed cassettes are read from the RAM 125 (8-17). In the embodiment, the priority of the feed cassette 216 is "2" because it holds the recycled sheets, and the priority of the feed cassette 217 is "1" because it holds the plain sheets. The feed cassette 217 of which the priority is highest is selected as the optimum feed cassette (8-18), and the copying starts (8-20). Thus, the feed cassette is automatically selected on the basis of the information which represents the kind of recording sheet capable of being discharged to the discharge tray to which the sheets should be discharged in the operation of that time.

Next, automatic change of the sheet cassette in a case where the feed cassette selected as the optimum becomes empty will be explained with reference to FIGS. 9A and 9B. In the embodiment, it is assumed that the feed cassette 214 holds the B4 recording sheets, the feed cassette 215 holds the A4 recording sheets, the feed cassette 216 holds the A4 recording sheets, and the feed cassette 217 holds the A4 recording sheets. Further, it is assumed that the kinds of recording sheets for the respective feed cassettes are designated on the operation unit 123 so that the feed cassette 214 holds the plain sheets, the feed cassette 215 holds the color sheets, the feed cassette 216 holds the plain sheets, and the feed cassette 217 holds the plain sheets.

Further, in a case where the 100 A4 document sheets are copied, it is assumed that such the copying starts in the state that the feed cassette 214 holds 100 recording sheets, the feed cassette 215 holds 20 recording sheets, the feed cassette 216 holds 50 recording sheets, and the feed cassette 217 holds 100 recording sheets. First, if the copying starts (9-1), it is judged whether or not the copying is completed (9-2). If not completed, it is judged whether or not the recording sheet (paper) is present in the feed cassette from which the sheets are being fed at the present time (9-5). If present, the copying is continued, while if not present, it is further judged based on the information obtained in the steps 8-6 to 8-9 whether or not another selectable feed cassette is present (9-6). If not present, it is displayed on the operation unit 123 that an optimum recording sheet is not present (9-20), and the operation terminates.

Next, the discharge tray to which the recording sheets should be discharged is determined by referring to the discharge trays designated on the screen of FIG. 7H and stored in the RAM 125, and the type of recording sheet capable of being discharged to the determined discharge tray is read from the ROM 124 or the RAM 125 (9-7). In the embodiment, the discharge tray to which the recording sheets should be discharged is the discharge tray 305, and the type of recording sheet capable of being discharged to the discharge tray 305 is the plain sheet or the recycled sheet.

Next, the kinds of recording sheets in the feed cassettes 215, 216 and 217 are read from the RAM 125. In the embodiment, it is assumed that the feed cassette 215 holds the color sheets, the feed cassette 216 holds the plain sheets, and the feed cassette 217 holds the plain sheets. At this time, it is judged whether or not the kind of recording sheet in each feed cassette is coincident with the kind of recording sheet capable of being discharged to the discharge tray 305 (9-8). Since the feed cassette 215 holds the color sheets, this cassette is eliminated from the selectable target (9-10). On the other hand, the feed cassettes 216 and 217 satisfy the condition in the step 9-8 (9-9). If all the target feed cassettes are checked (9-11), it is further judged whether or not there is the selectable feed cassette on the basis of the kinds of recording sheets in the feed cassettes and the kind of recording sheet capable of being discharged to the designated discharge tray (9-12). If the feed cassette being the feed target is not present, it is displayed on the operation unit 123 that an optimum recording sheet is not present (9-20), and the operation terminates. In this case, the feed cassettes 216 and 217 are designated as the target feed cassettes from which the recording sheets are fed.

Next, the designated priorities of the kinds of recording sheets in the feed cassettes are read from the RAM 125 (9-13). In the embodiment, the priority of the feed cassette 216 is "1" because it holds the plain sheets, and the priority of the feed cassette 217 is "1" because it holds the plain sheets. Here, since the transportation path of the feed cassette 216 is shorter than that of the feed cassette 217 as shown in FIG. 1, the feed cassette 216 is selected as the optimum feed cassette (9-14), and the copying starts (9-15, 9-16).

At this time, the feed cassette is stored as the feed cassette 216 and A4 size, and the kind of recording sheet is stored as the plain sheet. If the copying starts, the 20 recording sheets are fed from the feed cassette 216. After feeding the 20 recording sheets, since the feed cassette 216 becomes empty (9-17), it searches for another feed cassette from which the recording sheets can be fed (9-18). Here, the feed cassettes holding the A4 recording sheets are the feed cassettes 215 and 217. At this time, the kind of recording sheet held in the feed cassette 215 is the color sheet, the kind of recording sheet held in the feed cassette 217 is the plain sheet, and the kind of recording sheets being fed at the present time is the plain sheet, whereby the feed cassette 217 is resultingly selected (9-19), and thus the sheet feeding is continued. After feeding the 50 recording sheets from the feed cassette 217, also the feed cassette 217 becomes empty.

Next, the remaining feed cassette holding the A4 recording sheets is the feed cassette 215. Since the kind of recording sheets being fed at the present time is the plain sheet, such the kind is not coincident with the kind of recording sheet of the feed cassette 215 to which the color sheets are set (9-18). Since the feed cassette 215 holds the color sheets, it causes the jam if these sheets are fed, whereby the feeding operation is terminated, and it is displayed on the operation unit 123 that an A4 plain sheet is not present (9-20).

Figure 10:
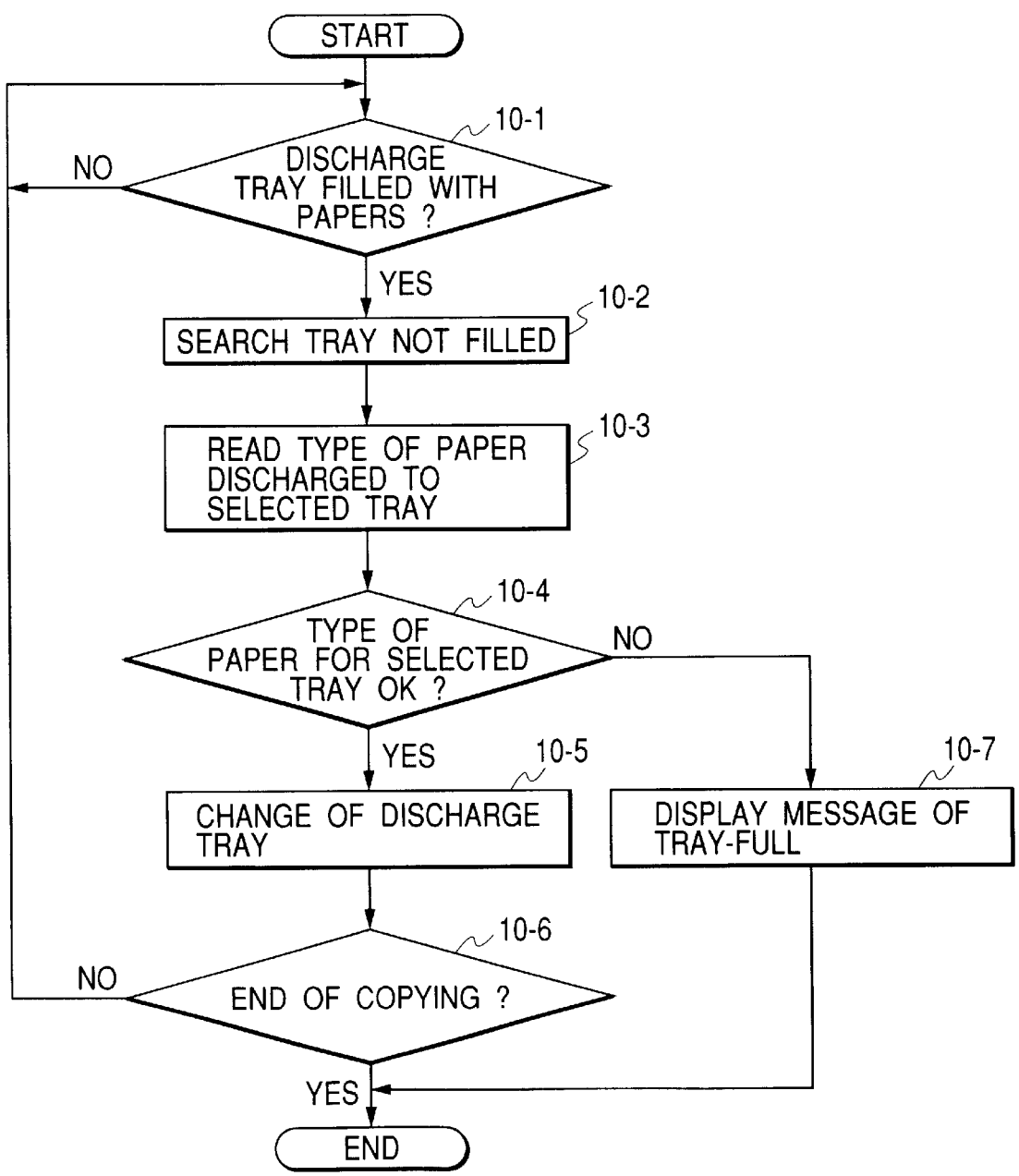
FIG. 10 is a flowchart of discharge tray change when the feed cassette according to the embodiment of the present invention is filled with papers.

Next, the discharge tray change when the feed cassette is filled with papers (discharged recording sheets) will be explained with reference to FIG. 10. It is assumed that the discharge trays 210 and 305 are selected, the second traced sheet (thin sheet) of the feed cassette 215 is selected, the number of output copies is set to 999, and the 500 sheets have been discharged at the present time. In such a state, it is first sensed that the 500 discharged recording sheets are stacked on the discharge tray 305 and thus the tray 305 is filled with the papers (10-1). Therefore, a next discharge tray to which the sheet discharge can be continued is searched (10-2). The discharge trays 210 and 305 are being selected at the present time, and the kind of recording sheet capable of being discharged to the discharge tray 305 is discriminated (10-3). Only the plain sheet and the recycled sheet can be discharged to the discharge tray 305, but the second traced sheet (thin sheet) discharged to the discharge tray 210 cannot be discharged to the discharge tray 305. Therefore, it is judged that the discharge tray cannot be changed from the tray 210 to the tray 305 for the sheet discharge (10-4), the sheet feed is terminated, and it is displayed on the operation unit 123 that the discharge tray is filled with papers (10-7). That is, the operation is interrupted until the recording sheets on the discharge tray 210 are removed by the user.

On the other hand, there is a case where the discharge trays 210 and 305 are selected when the plain sheets are being held in the feed cassette 215, and this case will be explained. The number of output copies is set to 999, the plain sheets are held in the feed cassette 215, and the 500 sheets have been discharged at the present time. In this state, it is sensed that the 500 discharged recording sheets are stacked on the discharge tray 305 and thus the tray 305 is filled with the papers. Therefore, a next discharge tray to which the sheet discharge can be continued is searched. The discharge trays 210 and 305 are being selected at the present time, and the kind of recording sheet capable of being discharged to the discharge tray 305 is discriminated. Only the plain sheet and the recycled sheet can be discharged to the discharge tray 305, and the plain sheet discharged to the discharge tray 210 can be discharged also to the discharge tray 305. Therefore, the discharge tray is changed from the tray 210 to the tray 305, and the sheet discharge is continued (10-5), and then, the operation is terminated after the remained 499 sheets were discharged (10-6).

Figure 11:
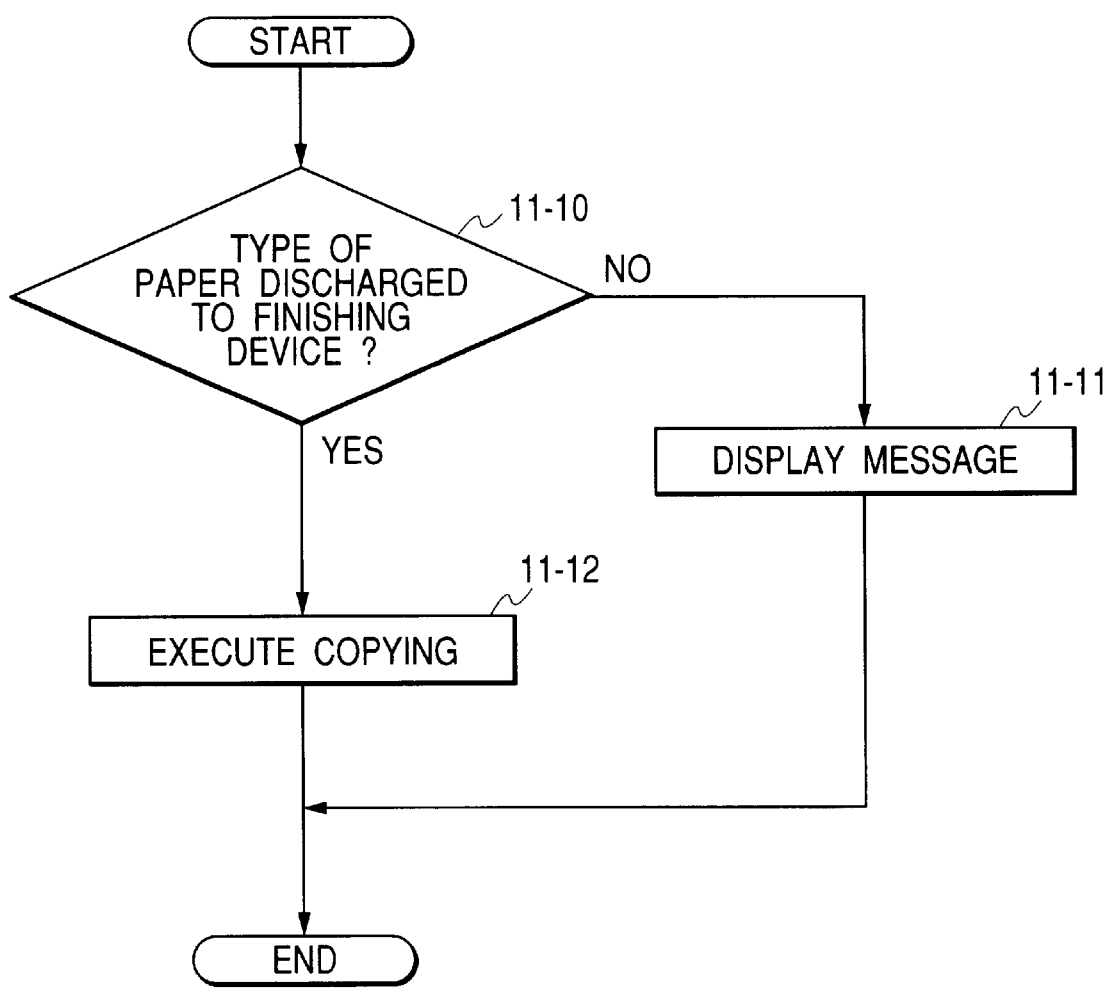
FIG. 11 is a flowchart in a case where a finishing device 3 according to the embodiment of the present invention is being connected.

Next, the operation in the case where the stapler and the punch unit are connected will be explained with reference to FIG. 11. As shown in FIG. 1, the stapler and the punch unit together constitute the finisher 3 which is connected to the discharge tray 305. It is assumed that the feed cassette 214 holds the B4 recording sheets, the feed cassette 215 holds the A4 recording sheets, the feed cassette 216 holds the A4 recording sheets, and the feed cassette 217 holds the A4 recording sheets. Further, it is assumed that the kinds of recording sheets for the respective feed cassettes are designated on the operation unit 123 so that the feed cassette 214 holds the plain sheets, the feed cassette 215 holds the thick sheets, the feed cassette 216 holds the plain sheets, and the feed cassette 217 holds the plain sheets. Further, in a case where the 100 A4 document sheets are copied, it is assumed that the feed cassette 215 is selected and punching is designated.

First, the kinds of recording sheets capable of being discharged to the punch unit are confirmed (11-10). The punch unit is connected to the discharge tray 305, and the kinds of recording sheets dischargeable to the discharge tray 305 are the plain sheet and the recycled sheet. On the other hand, since the selected feed cassette 215 holds the thick sheets, the recorded sheet can not be discharged to the discharge tray 305. Therefore, a message "punching is impossible for this type of recording sheet" is displayed on the operation unit 123 (11-11), and the operation is disenabled. If the finishable sheet type, the copying is executed (11-12).

Besides, there is a case where the kind of recording sheet is not limited for the discharge tray 305 but the kind of recording sheet is limited for the finisher. In this case, similarly, the limitation of the kind of recording sheet for the finisher is applied instead of the limitation of the kind of recording sheet for the discharge tray 305, and the message "punching is impossible for this type of recording sheet" is displayed if the thick sheet cannot be discharged to the finisher 3.

Figure 12B:
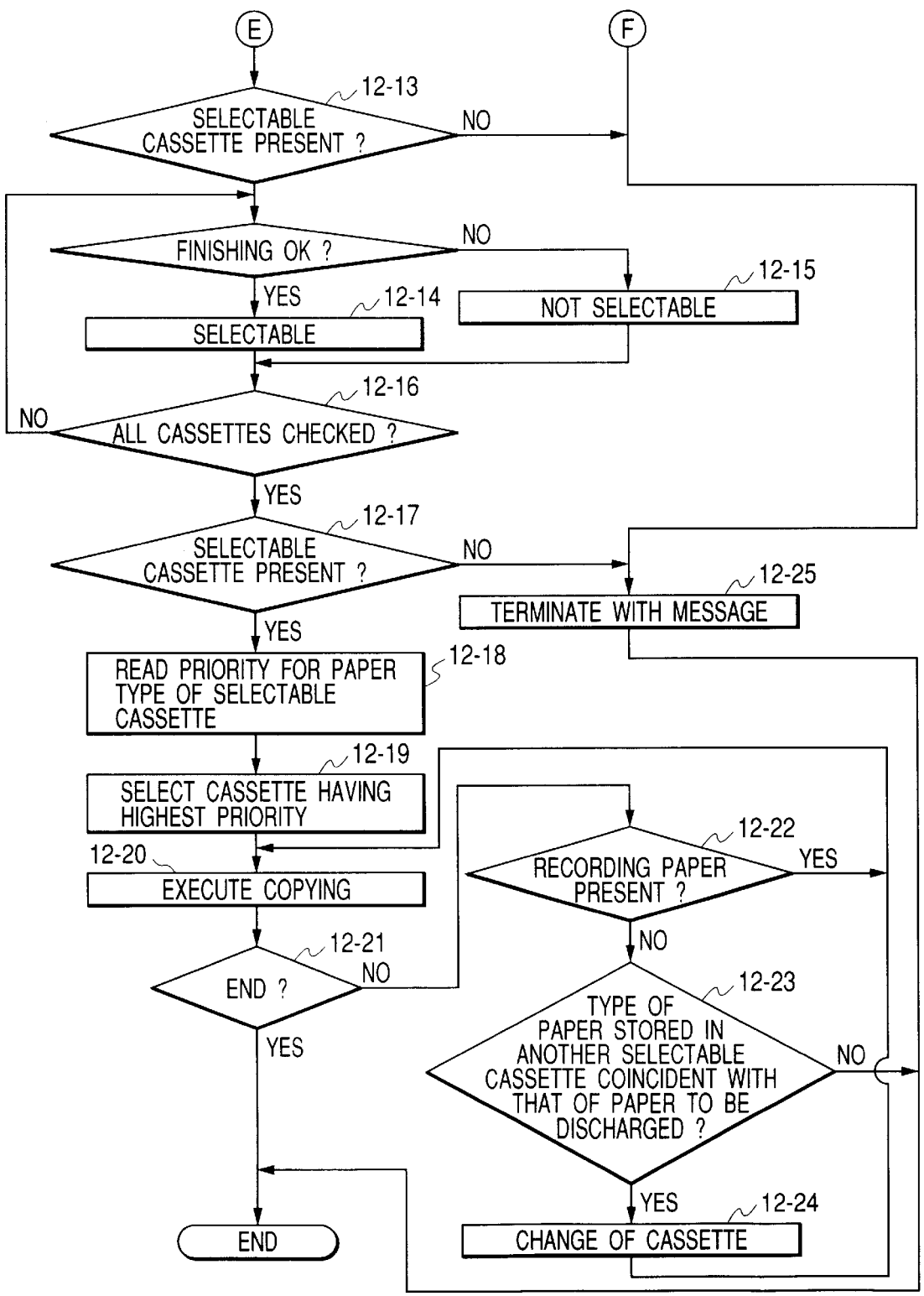
FIG. 12, which is comprised of the FIGS. 12A and 12B, is a flowchart of the feed cassette automatic change in the case where the finishing device 3 according to the embodiment of the present invention is being connected.

Next, a case of automatically selecting the feed cassette when the stapler and the punch unit are connected will be explained with reference to FIGS. 12A and 12B. First, it is judged by the not-shown document sensor mounted on the document sheet tray of the document sheet feeding device 101 of FIG. 1 whether or not the document sheet is present. At this time, if the document sheet is not present on the tray of the not-shown document sheet mounting board, the size sensed by the size sensed on the board is read from the RAM 125. On the other hand, if the document sheet is present in the document sheet feeding device 101, such document sheet is fed, and the document sheet size is sensed on the basis of the width of the document sheet guide and the length of the document sheet fed onto the document sheet mounting board glass. In the embodiment, since the width of the document sheet fed is 297 mm and the length of the document sheet fed is 210 mm, the document sheet size is sensed as A4 (12-1).

Next, the recording sheet optimum for the A4 document sheet is selected. First, the sizes of all the feed cassettes are detected (12-2), and it is judged whether or not the feed cassette being the target of APS is present (12-3). In the embodiment, since the recording sheet sizes of the feed cassettes 214, 215, 216 and 217 are B4, A4, A4 and A4 respectively, the feed cassettes 215, 216 and 217 first become the targets of APS. Then, it is sensed whether or not the recording sheet is actually present in these cassettes (12-3). Since the recording sheets are held in the respective feed cassettes, these cassettes are designated the selectable targets (12-4). On the other hand, if the recording sheet is not held in these cassettes, they are eliminated form the selectable target (12-5). Such a check is performed to all the feed cassettes (12-6). Here, if the feed cassette being the feed target is not present (12-7), it is displayed on the operation unit 123 that an optimum recording sheet is not present (12-25), and the operation terminates.

Next, the discharge tray to which the recording sheets should be discharged is determined by referring to the discharge trays designated on the screen of FIG. 7H and stored in the RAM 125, and the type of recording sheet capable of being discharged to the determined discharge tray is read from the ROM 124 or the RAM 125 (12-8). The discharge tray to which the recording sheets should be discharged is determined as the discharge tray 210. However, since the finisher 3 is being connected to the discharge tray 305, the finishing cannot be executed if the sheets are discharged to the discharge tray 210, whereby the discharge tray is changed from the tray 210 to the tray 305 (12-30). The kinds of recording sheets capable of being discharged to the discharge tray 305 are the plain sheet and the recycled sheet, whereby the plain sheet and the recycled sheet are stored as the types of dischargeable recording sheets.

Next, the kinds of recording sheets in the feed cassettes 215, 216 and 217 are read from the RAM 125. In the embodiment, the feed cassette 215 holds the color sheets, the feed cassette 216 holds the recycled sheets, and the feed cassette 217 holds the plain sheets. At this time, it is judged whether or not the kind of recording sheet in each feed cassette is coincident with the kind of recording sheet capable of being discharged to the discharge tray 305 (12-9). Since the feed cassette 215 holds the color sheets, this cassette is eliminated from the selectable target (12-11). On the other hand, the feed cassettes 216 and 217 satisfy the above condition in the step 12-9 (12-10). If the feed cassette being the feed target is not present (12-12, 12-13), it is displayed on the operation unit 123 that an optimum recording sheet is not present (12-25), and the operation terminates.

Next, the designated priorities of the kinds of recording sheets in the feed cassettes are read from the RAM 125 (12-18). In the embodiment, the priority of the feed cassette 216 is "2" because it holds the recycled sheets, and the priority of the feed cassette 217 is "1" because it holds the plain sheets. Thus, the feed cassette 217 of which the priority is highest is selected as the optimum feed cassette (12-19), and the copying starts (12-20). In addition, steps 12–21 to 12–24 in FIG. 12B correspond to steps 9–16 to 9–19 in FIG. 9B, respectively.

Besides, there is a case where the kind of recording sheet is not limited for the discharge tray 305 but the kind of recording sheet is limited for the finisher 3. In this case, similarly, the limitation of the kind of discharged recording sheet for the finisher 3 is applied instead of the limitation of the kind of discharged recording sheet for the discharge tray 305, and the plain sheet is selected if the color sheet cannot be discharged to the finisher 3 (12-14). In addition, steps 12-15 to 12-17 correspond to steps 12-11 to 12-13, respectively.

Further, if the recording sheets in the feed cassette from which the sheets are being fed at the present time become empty while the finishing is being executed, since the recording sheet capable of being discharged to the finisher and the discharge tray is limited in consideration of the performance after the finishing, it is judged whether or not it is possible to feed the recording sheet of the same kind as that of the sheets being fed at the present time. Here, the kind of recording sheets being fed at the present time is the plain sheet, and there is no feed cassette corresponding to the plain sheet. Therefore, in this case, the feeding is stopped, and it is displayed on the operation unit 123 that a recording sheet is not present.

As above, the kinds of recording sheets have been described as the plain sheet, the recycled sheet and the color sheet, but the present invention is not limited to them. Further, it was described that the thick sheet is not selected when the finishing of punching the hole is executed, but the present invention is not limited to such the example. That is, when the stapling is executed, the OHP sheet and the second traced sheet causing trouble are not selected. Besides, when the finishing is executed, the kinds of recording sheets causing trouble are not selected.

As explained above, it is possible to cope with the situation that the kinds of recording sheets capable of being discharged by the discharger are limited. Further, according to the present invention, it is possible to avoid jamming and the like in the automatic selection of the recording sheet, the automatic change of the feeder when the recording sheets in this feeder are exhausted, and the process when it is sensed that the discharger is filled with the sheets, in consideration of the limitation of the kinds of recording sheets capable of being discharged by the discharger of the image forming apparatus. Furthermore, it is possible to cope with the case where the finisher to which the kinds of recording sheets capable of being discharged are limited is being connected.

What is claimed is:

1. An image forming apparatus comprising:
    a plurality of feeders for feeding recording sheets;
    an image forming unit for forming images on the recording sheets fed from said plurality of feeders;
    a plurality of dischargers for discharging the recording sheets on which the images have been formed respectively by said image forming unit;
    a discriminator for discriminating kinds of recording sheets respectively set to said plurality of feeders;
    an indicator for indicating, from among said plurality of dischargers, a discharger by which the recording sheets should be discharged; and
    a selecting unit for selecting a feeder in accordance with said discharger indicated by said indicator and the kind of recording sheet discriminated by said discriminator.

2. An apparatus according to claim 1, wherein said selecting unit selects said feeder on the basis of the kind of recording sheet capable of being discharged by said discharger indicated by said indicator.

3. An apparatus according to claim 2, further comprising a memory for storing information relating to the kinds of recording sheets capable of being discharged by said plurality of dischargers, respectively,
    wherein said selecting unit selects said feeder to which the recording sheets of the kind capable of being discharged by said discharger indicated by said indicator have been set, on the basis of the information stored in said memory.

4. An apparatus according to claim 3, further comprising a display for displaying that an optimum recording sheet is not present, on the basis that there is no feeder among said plurality of feeders to which the recording sheets of the kind capable of being discharged by said discharger indicated by said indicator have been set.

5. An apparatus according to claim 3, further comprising a designator for designating a priority among the kinds of recording sheets, wherein said selecting unit selects said feeder on the basis of the priority designated by said designator.

6. An apparatus according to claim 1, further comprising a designator for designating the kinds of recording sheets respectively set to said plurality of feeders, wherein said discriminator discriminates the kinds of recording sheets in accordance with the designation by said designator.

7. An apparatus according to claim 1, further comprising a second discriminator for discriminating a size of an image to be formed on a recording sheet, wherein said selecting unit selects a feeder on the basis of the size of the image discriminated by said second discriminator.

8. An apparatus according to claim 1, wherein said image forming apparatus can execute at least two copy modes among a plurality of copy modes, a facsimile mode and a printer mode, and further comprises a designator for designating a discharger by which a recording sheet to which an image has been formed in the mode should be discharged, and wherein said indicator indicates said designated discharger.

9. An apparatus according to claim 1, wherein at least one discharger among said plurality of dischargers discharges the recording sheets to a finisher executing finishing of the recording sheets, at least another discharger discharges the recording sheets to a tray above said image forming unit, and the kinds of recording sheets capable of being discharged by the discharger discharging the recording sheet to said finisher are limited.

10. An apparatus according to claim 1, wherein at least two dischargers among said plurality of dischargers discharge the recording sheets to trays above said image forming unit, and the kinds of recording sheets capable of being discharged by said plurality of dischargers discharging the recording sheets to the upper tray among the trays above said image forming unit are limited.

* * * * *

UNITED STATES PATENT AND TRADEMARK OFFICE
CERTIFICATE OF CORRECTION

PATENT NO. : 6,714,747 B2
DATED : March 30, 2004
INVENTOR(S) : Hidehiko Asai

It is certified that error appears in the above-identified patent and that said Letters Patent is hereby corrected as shown below:

Column 1,
Line 24, "comes" should read -- has come --; and
Line 34, "has solved" should read -- can solve --.

Column 4,
Line 16, "memory along," should read -- memory, along --.

Column 8,
Line 7, "such the" should read -- such --.

Column 9,
Line 67, "remained" should read -- remaining --; and "were" should read -- are --.

Column 12,
Line 12, "the" should read -- an --.

Signed and Sealed this

Twenty-seventh Day of July, 2004

JON W. DUDAS
*Acting Director of the United States Patent and Trademark Office*